United States Patent Office 3,493,654
Patented Feb. 3, 1970

3,493,654
STABILIZED AQUEOUS BROMINE COMPOSITIONS
Robert D. Goodenough and Jack F. Mills, Midland, Mich., assignors to The Dow Chemical Company, Midland, Mich., a corporation of Delaware
No Drawing. Filed Jan. 19, 1967, Ser. No. 610,237
Int. Cl. A01n 11/00
U.S. Cl. 424—127      4 Claims

ABSTRACT OF THE DISCLOSURE

A method of stabilizing aqueous bromine solutions against reduction of the bromine or hypobromite concentration therein by adding thereto biuret, succinimide, ureau and lower aliphatic mono and disubstituted ureas containing 2 to 4 carbon atoms in each substituent group. Bromine solutions stabilized in this manner retain an acceptable level of bactericidal activity.

BACKGROUND OF THE INVENTION

Bromine in aqueous solutions and aqueous solutions containing hydrobromite are widely accepted as bactericides and find particular utility in the treatment of swimming pool water. When such solutions are used under conditions of exposure to sunlight, however, decomposition of the available bromine apparently takes place with a consequent reduction of bactericidal activity.

SUMMARY OF THE INVENTION

This invention relates to a method for stabilizing aqueous bromine solution and more particularly relates to a process whereby aqueous bromine solutions are stabilized against the degrading effects of ultraviolet light.

It is, therefore, an object of the present invention to provide a method of stabilizing aqueous solutions containing bromine or hypobromite against loss of available bromine due to the action of ultraviolet light. It is an additional object of the present invention to provide a process whereby bromine in aqueous solutions is sufficiently stabilized to provide continuous bactericidal protection to a body of water for extended periods of time even in the presence of ultraviolet light. A further object is to provide a relatively stable aqueous bromine-containing solution having bactericidal properties. Other objects and advantages of the present invention will become apparent in the course of the following specification.

It has now been discovered that by the addition of certain nitrogen-containing compounds to aqueous bromine solutions and solutions containing an aqueous hypobromite such solutions are stabilized against reduction of the bromine or hypobromite concentration thereof in the presence of sunlight as well as maintaining an acceptable level of bactericidal activity in such aqueous solutions.

DESCRIPTION OF PREFERRED EMBODIMENTS

The bromine stabilizers useful herein are those compounds selected from the group consisting of biuret, succinimide, urea, and lower aliphatic mono and disubstituted ureas containing from about 2 to about 4 carbon atoms in each substituent group. For most bromine stabilization applications, succinimide has proved to be particularly effective in stabilizing the bromine values while simultaneously retaining sufficient of the germicidal activity of the bromine values to maintain an acceptably low bacterial level. It has found special application in stabilizing the bromine values in swimming pools.

In general, bromine is used as a germicide in swimming pools in a concentration of from 0.1 part per million to about 3.0 p.p.m. When used for germicidal or bleach solution, the bromine concentration in water is normally from about 0.02% to about 10% by weight. If such aqueous solutions of bromine are to maintain their bactericidal properties and are to maintain an effective bromine concentration in the presence of ultraviolet light, it is necessary to add from about 5 parts per million to about 100 p.p.m. of bromine stabilizer to the bromine-containing water. In general, the weight ratio between bromine present and the stabilizer should be from about 0.002:1 to 2:1 in order to maintain a desirable level of stability.

As the temperature of the aqueous bromine solution increases, the difficulty of stabilization increases and the decay of the active bromine concentration in the aqueous solution increases rapidly as the temperature approaches the boiling point of water. Likewise, as the temperature of the solution decreases, stabilization of the bromine becomes less difficult. In general, the stabilization process and compositions contained herein are effective over the range of about 32° F. to about 200° F. at about atmospheric pressure. However, more effective stabilization is usually achieved below about 100° F.

Addition of the bromine stabilizer to the aqueous bromine or hypobromite solution may be achieved by any suitable means to achieve the desired proportion. For example, solid bromine stabilizer may be added directly to the aqueous solution or the bromine-containing solution may be passed through a bed of bromine stabilizer or such stabilizer may be prepared as a relatively concentrated aqueous solution and added to the aqueous bromine solution to be stabilized.

The following examples are provided as a detailed description of the invention but the scope of such invention is not to be construed as limited thereby.

EXAMPLE 1

To a quantity of tap water having a pH of 7.2 was added sufficient saturated bromine water to give a final bromine concentration of 1.75 parts per million. Bromine concentration was determined amperometrically using phenylarsene oxide as a titrant. To a second quantity of tap water having a pH of 7.2 was added sufficient saturated bromine water to give a final bromine concentration of 2.2 parts per million. To the second solution was also added a sufficient quantity of succinimide to give a final concentration of 20 parts per million. Both solutions were maintained at about room temperature and irradiated with a commercial sun lamp positioned above the container of water such that a light meter produced the same value as natural sunlight on a sunny summer day at noon. Periodic samples of both the stabilized and unstabilized bromine-containing aqueous solutions were taken and analyzed for bromine. The first (unstabilized) bromine solution showed a loss of bromine equivalent to 32% per hour. The second or stabilized bromine solution showed a bromine loss equivalent to 7.5% by weight per hour. The bromine determination was conducted by amperometric titration with phenylarsene oxide.

EXAMPLE 2

To a 36,000 gallon swimming pool, equipped with a vinyl liner and a sand filter and containing approximately 1 part per million bromine, was added 7 parts per million of succinimide. The water temperature was 73° F., air temperature 71° F. and the pH of the water was 7.3. The entire pool was exposed to direct sunlight. Periodic analysis of the water for bromine showed a loss rate from bromine of 32% per hour.

To the same swimming pool containing approximately 1 part per million bromine and on a similar day was added 20 parts per million succinimide. The analysis of periodic samples showed a bromine loss rate of only 8% per hour.

Analysis of the same swimming pool on a similar day containing initially 1 part per million bromine but no stablizer showed a bromine loss rate of 65% per hour.

EXAMPLE 3

In order to show the effectiveness as a bactericide of a bromine solution containing a bromine stabilizer, a time-kill study was made on an *E. coli* solution with a population of 163,000 cells per milliliter. The stabilized bromine solution contained 1.0 part per million bromine and 25 parts per million succinimide and was contacted with the *E. coli* solution for various time intervals. Residual bromine was then neutralized with sodium thiosulfate and swabs of the inoculated solution were made on the sterile agar plates as a function of time. After incubation, the plates were read for bacterial population. The results were as follows:

| | Percent kill | Time in seconds |
|---|---|---|
| *E. coli* cells per milliliter: | | |
| 163,000 | 0 | 0 |
| 80,000 | 51 | 15 |
| 18,000 | 89 | 30 |
| 1,000 | 99.4 | 45 |
| 0 | 100 | 60 |
| 0 | 100 | 120 |

EXAMPLE 4

In order to demonstrate the improvement in half-life of bromine solution containing the bromine stabilizers of this invention, one liter samples of water containing 5 p.p.m. by weight of bromine were added to a 1500 ml. beaker. The water solution has a pH of 7.5 and contained 100 p.p.m. alkalinity (as p.p.m. $CaCO_3$) and 150 p.p.m. hardness (as p.p.mp $CaCO_3$). To each of the samples of aqueous bromine solution, except for the control, was added a quantity of a bromine stabilizer. The solutions were then subjected to an ultraviolet light intensity of 6.2 E. vitons per square centimeter (equivalent to average sunlight intensity per June day) of water surface and the half-life of the bromine concentration in such solution was determined. The results obtained are shown in the following table:

| Bromine Stabilizer | Concentration in p.p.m. | Half-life of bromine, hours |
|---|---|---|
| None (control) | | 2.6 |
| Succinimide | 50 | 22.0 |
| | 25 | 22.0 |
| Urea | 100 | 4.0 |
| Biuret | 25 | 5.6 |
| Acetyl urea | 20 | 6.6 |
| Diacetyl urea | 10 | 6.3 |

In order to establish that the stabilization of the bromine solution with the bromine stabilizer retains adequate germicidal properties, quantities of aqueous solutions containing 0.1 weight percent bromine were stabilized with 100 p.p.m. of bromine stabilizer and adjusted to a pH of 8.0. The solutions were then diluted with water and inoculated with *E. coli* bacteria and, after a time period, a 1.0 ml. sample was neutralized with sodium thiosulfate to remove residual bromine, pipetted onto a sterile agar plate and spread evenly on the surface. Bacterial counts were then made to establish the kill time for the stabilized solution. The results are shown in the following table:

| Bromine stabilizer | Stabilizer, p.p.m. | Initial bromine conc., p.p.m. | Final bromine conc., p.p.m. | Time, min. | Initial bacterial count | Percent bacterial kill |
|---|---|---|---|---|---|---|
| Succinimide | 25 | 0.75 | 0.70 | 1 | $10^6$/ml. | 99.99 |
| Biuret | 25 | 1.03 | 0.90 | 1 | $10^6$/ml. | 100 |
| Urea | 25 | 1.20 | 1.10 | 1 | $10^6$/ml. | 100 |
| Acetyl urea | 100 | 0.99 | 0.74 | 0.50 | $10^6$/ml. | 100 |
| Diacetyl urea | 25 | 1.08 | 0.95 | 0.25 | $10^6$/ml. | 100 |

We claim:
1. An aqueous composition comprising water containing from about 0.2 to about 10 p.p.m. by weight of bromine and, as a bromine stabilizer, biuret, in a concentration sufficient to produce a weight ratio between said bromine and said stabilizer of from about 0.002:1 to about 2:1.
2. The composition of claim 1 wherein the stabilizer is present in a quantity of from about 5 to about 100 parts per million.
3. An aqueous composition comprising water containing from about 0.2 to about 10 p.p.m. by weight of bromine and, as a bromine stabilizier succinimide, in a concentration sufficient to produce a weight ratio between said bromine and said stabilizer of from about 0.002:1 to about 2:1.
4. The composition of claim 3 wherein the stabilizer is present in a quantity of from about 5 to about 100 parts per million.

References Cited

UNITED STATES PATENTS

| 2,106,513 | 1/1938 | Allison | 210—62 |
| 2,580,808 | 1/1952 | Marks et al. | 210—62 |
| 3,078,277 | 2/1963 | Geeting. | |

OTHER REFERENCES

Chem. Abstracts: Farbwerke et al., vol. 51, p. 11762e (1957).

ALBERT T. MEYERS, Primary Examiner

V. D. TURNER, Assistant Examiner

U.S. Cl. X.R.

424—174; 322